(12) United States Patent
Costas

(10) Patent No.: US 7,997,221 B2
(45) Date of Patent: Aug. 16, 2011

(54) APPARATUS FOR REDUCING DRAG ON A NAUTICAL VESSEL

(76) Inventor: Dan Nicolaus Costas, Culver City, CA (US)

( * ) Notice: Subject to any disclaimer, the term of this patent is extended or adjusted under 35 U.S.C. 154(b) by 0 days.

(21) Appl. No.: 12/728,661

(22) Filed: Mar. 22, 2010

(65) Prior Publication Data
US 2010/0236466 A1    Sep. 23, 2010

Related U.S. Application Data

(60) Provisional application No. 61/210,685, filed on Mar. 23, 2009.

(51) Int. Cl.
*B63B 1/34* (2006.01)
*B63B 1/38* (2006.01)

(52) U.S. Cl. .................................................... 114/67 A
(58) Field of Classification Search ............ 114/67 R, 114/67 A, 288–290
See application file for complete search history.

(56) References Cited

U.S. PATENT DOCUMENTS

| | | | |
|---|---|---|---|
| 661,303 A | | 11/1900 | Briggs |
| 907,086 A | * | 12/1908 | Naselius ........................ 440/44 |
| 1,697,257 A | | 1/1929 | Anissimoff |
| 1,822,223 A | | 8/1931 | Klinger |
| 1,894,256 A | | 1/1933 | de Ganahl et al. |
| 2,145,463 A | | 1/1939 | Spinanger |
| 2,378,822 A | | 6/1945 | Barry |
| 2,954,750 A | | 11/1954 | Crump et al. |
| 3,342,032 A | * | 9/1967 | Cox et al. ........................ 60/221 |
| 3,534,699 A | * | 10/1970 | Ruona ........................ 114/67 R |
| 4,393,802 A | | 7/1983 | Rizzo |
| 4,513,679 A | | 4/1985 | Allen |
| 5,031,559 A | | 7/1991 | Bartholomew |
| 5,054,412 A | | 10/1991 | Reed et al. |
| 5,090,352 A | | 2/1992 | Stanford |
| 5,117,882 A | | 6/1992 | Stanford |
| 5,456,201 A | | 10/1995 | Bobst |
| 5,476,056 A | | 12/1995 | Tokunaga et al. |
| 5,524,568 A | | 6/1996 | Bobst |
| 5,575,232 A | | 11/1996 | Kato et al. |
| 5,613,456 A | | 3/1997 | Kuklinski |

(Continued)

FOREIGN PATENT DOCUMENTS
EP           645302 A1 *  3/1995
(Continued)

OTHER PUBLICATIONS

Nouri, N. M. et al., "Improvement of a Microbubble Generator's Performance Via Reliance on Fluid Dynamics Characteristics", Journal, Jun. 2009, pp. 189-194, vol. 25-2, Journal of Mechanics, Tehran, Iran.

(Continued)

*Primary Examiner* — Ajay Vasudeva
(74) *Attorney, Agent, or Firm* — Marc E. Hankin; Kevin Schraven; Hankin Patent Law, A.P.C.

(57) ABSTRACT

The invention is an apparatus and method for reducing the drag that a vessel hull experiences when moving through the water by interposing air bubbles between the skin of the hull and the stream of water that the vessel is moving through. The invention delivers compressed air to the bottom of the vessel without the need for a high energy air compressor.

16 Claims, 15 Drawing Sheets

U.S. PATENT DOCUMENTS

| | | | |
|---|---|---|---|
| 5,967,071 A | 10/1999 | Wipper | |
| 6,092,480 A | 7/2000 | Takahashi et al. | |
| 6,145,459 A | 11/2000 | Takahashi et al. | |
| 6,186,085 B1 | 2/2001 | Kato et al. | |
| 6,324,480 B1 | 11/2001 | Takahashi et al. | |
| 6,356,816 B1 | 3/2002 | Katz | |
| 6,748,891 B2 | 6/2004 | Takahashi | |
| 7,004,094 B2 | 2/2006 | Carson | |
| 7,017,505 B2 | 3/2006 | Burg | |
| 7,267,067 B2 * | 9/2007 | Stubblefield et al. | 114/67 A |

FOREIGN PATENT DOCUMENTS

| | | | |
|---|---|---|---|
| JP | 61220997 A | * | 10/1986 |
| JP | 03243489 A | * | 10/1991 |
| JP | 2001239995 A | * | 9/2001 |
| JP | 2002274478 A | * | 9/2002 |

OTHER PUBLICATIONS

Seminar Topics, "Drag Reduction in Ships using Microbubbles Technology", Report, Feb. 2010, Published online at www.seminarprojects.com.

* cited by examiner

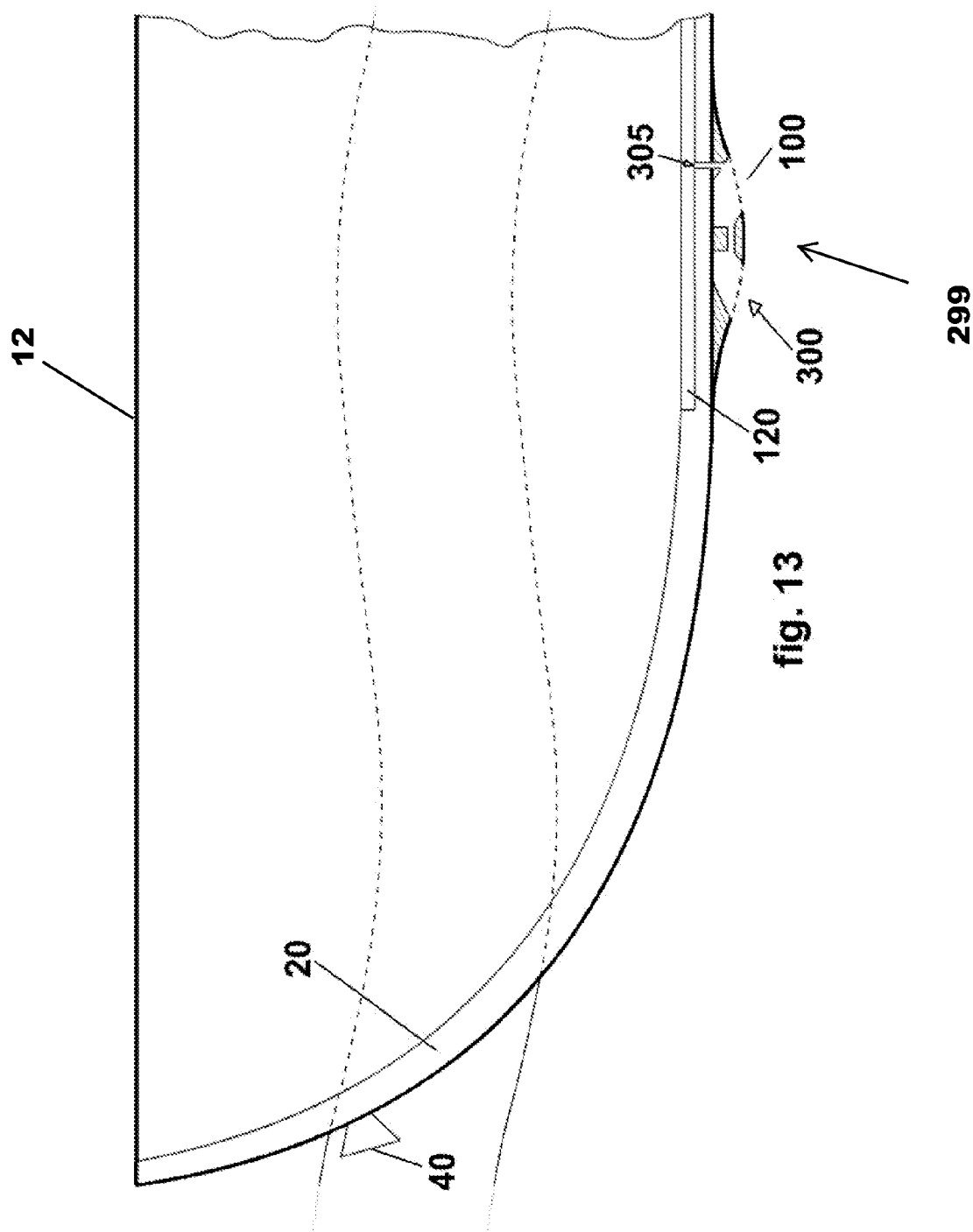

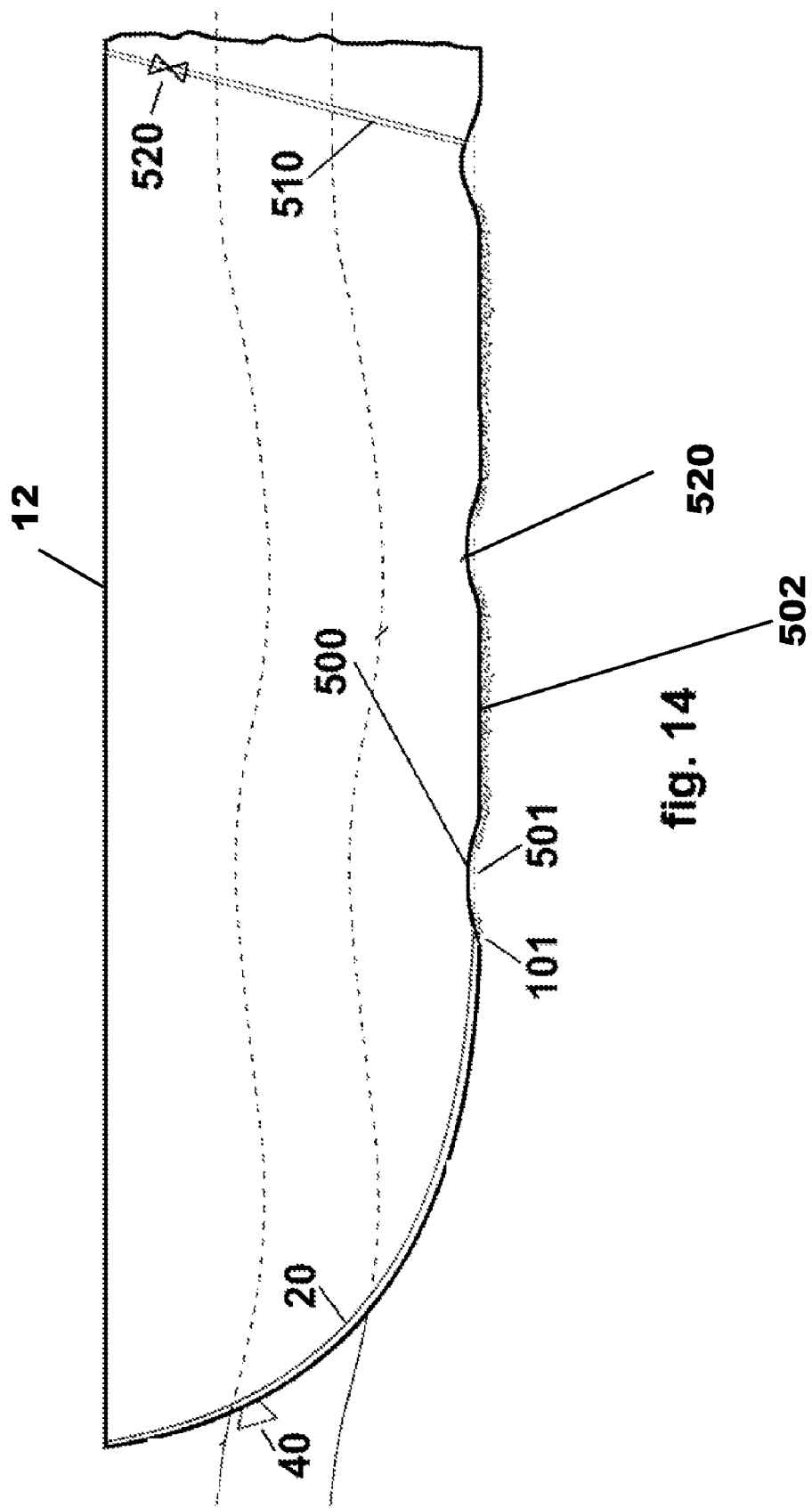

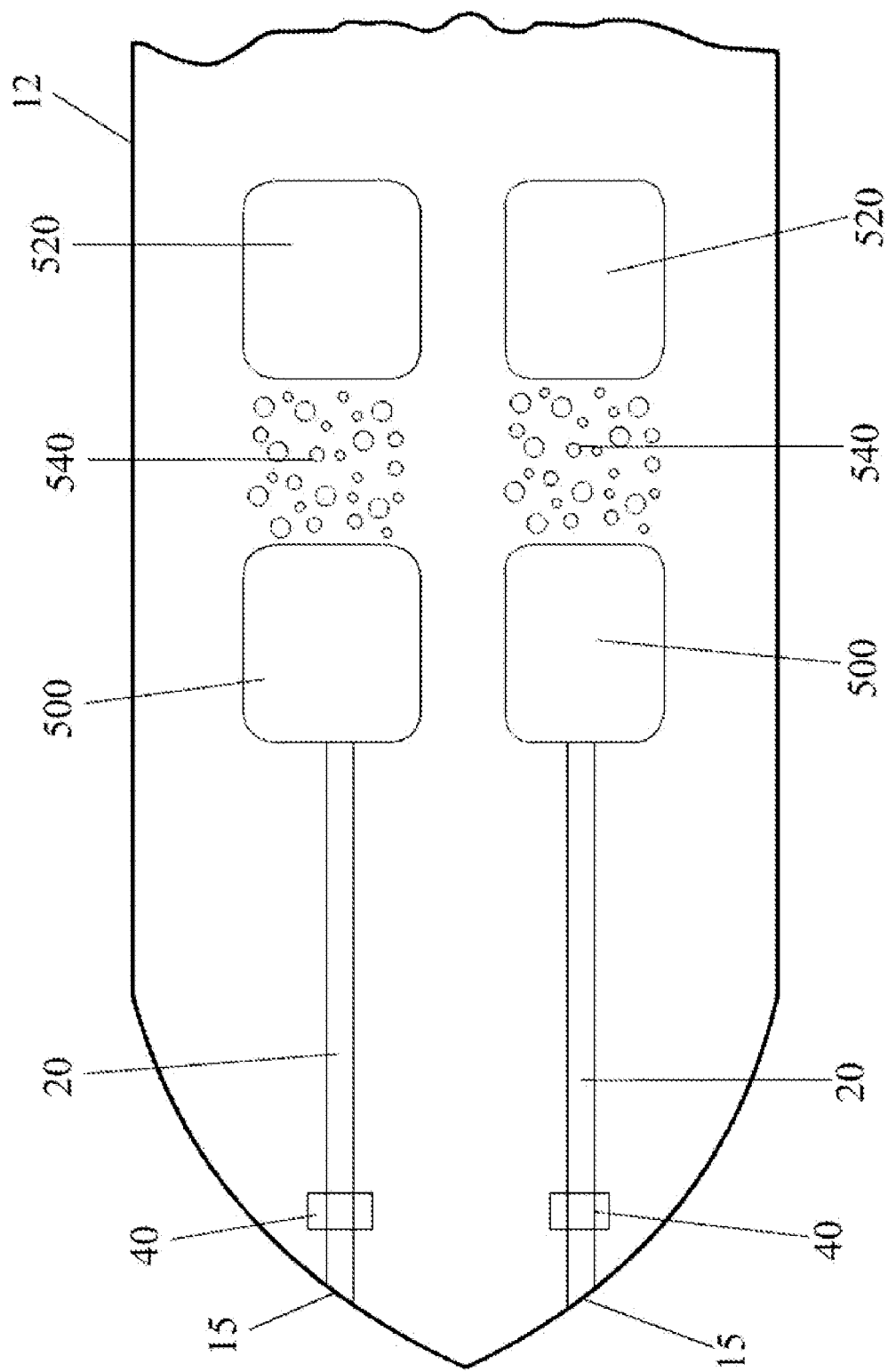

APPARATUS FOR REDUCING DRAG ON A NAUTICAL VESSEL

CROSS-REFERENCE TO RELATED APPLICATIONS

Priority is claimed to U.S. Provisional Patent Application Ser. No. 61/210,685, filed on Mar. 23, 2009, titled "Method and Systems for Naval Drag Reduction (Modular)," by inventor Dan Nicolaus Costas, the contents of which are expressly incorporated herein by this reference.

FIELD OF INVENTION

This invention relates to the method and apparatus for drag reduction by interposing air bubbles between the skin of the hull of a nautical vessel and the stream of water that the vessel is moving through. More particularly, the invention relates to a method and apparatus of interposing the air bubbles without the need of an air compressor or other external high energy source.

BACKGROUND

For years, nautical vessel makers have been aware that placing air bubbles on the bottom of a vessel hull will reduce the drag of the vessel as it passes through water. The challenge as been how to efficiently place the air bubbles on the bottom of the hull. The primary solution to the challenge is to use high energy air compressors to place air on the bottom of a hull for drag reduction. The air placement is typically accomplished by screens or ejector slits mounted in the hull surface of a ship, mostly on the bottom side. Due to the large hull surfaces that need to be covered, large amounts of air need to be provided to the bottom of the ship. Additionally, cleaning means for the screens or ejector slits need to be provided to prevent the clogging generated by marine algae barnacles and other marine organisms. Bottoms with air cavities expose just a fraction of the bottom of the hull to direct contact with the water, thus reducing the drag accordingly.

The concept of using air coated hulls to reduce drag in water has previously been suggested in the maritime literature. Indeed, reducing the hull skin friction component of drag by injecting bubbles or micro-bubbles was first reported in 1973 by the United States Naval Academy using a cylinder coated with small bubbles of hydrogen generated by electrolysis to study reduction in friction. More recently, the United States Defense Advanced Research Projects Agency (DARPA) funded a program to research reduction in friction drag focusing on developing numerical models and computer simulations for air/bubble injection and supported by scale model experiments. In Japan, the National Maritime Research Institute (NMRI) and the Shipbuilding Research Association has carried out bubble experiments using ships and scale models of ships in addition to plate experiments in test tanks. It has been reported that both an effect due to the reduced viscosity of air and the shearing of bubbles in the boundary layer occur. Hull skin friction reductions of up to 5% were reported for ships and up to 80% drag reduction for flat plates. In these experiments, the bubbles were active injections and had a power penalty. Moreover, they were only effective near the point of injection because they did not remain within the boundary layer close to the hull. In the NMRI full-scale tests they also degraded the efficiency of propellers. Another approach pioneered in Russia has been to pump air behind wedge and stepped shaped features to create an air-film along the body of the object, for example a torpedo, or via supercavitation to create the same effect.

It is clear that air films retained at a submerged solid surface should be able to reduce drag, but current approaches require an active input of energy to do so. For example, U.S. Pat. No. 5,524,568, issued to Bobst, discloses a boat hull that "creates a layer or film of bubbles adjacent the submerged region of a boat hull by releasing a flow of air at numerous spaced apart locations on that region of the hull." However, the Bobst invention requires the use of an air compressor pump, which takes energy and greatly reduces or even completely offsets the energy savings achieved by the effect of the bubbles.

There are numerous patents issued in this field using air bubbles which have been proved in lab tests to lower up to 80% the frictional component of the drag generated by a vessel's motion through water. Due to the fact that the air bubbles are most effective if they are released such that they will wash (or lubricate) the flat hull's bottom, and not released so the air bubble go out and up the side of the hull, the vast majority of these patents explicitly teach or suggest the use of an air compressor. An air compressor is the obvious way to overcome the high static water pressures present at the bottom of the submerged vessel hull. Unfortunately, the standard air compressors, while able to deliver air at high pressure, are very, very inefficient at delivering the high volumes of air needed for covering the large bottom surfaces of a flat bottomed vessel. Moreover, the energy economy obtained by the lubrication is largely offset by the air compressor's fuel consumption, rendering this solution essentially useless.

Other references, such as U.S. Pat. No. 6,748,891, try to replace the compressor using the various methods to create depression where air is drawn, and combine these methods with a standard air fan. The problem with U.S. Pat. No. 6,748,891 and other similar references, is that the small pressure differentials created work only for relatively small drafts. Additionally, regarding the combination with an air fan, there is a tradeoff between the volume and the pressure of the air delivered making them undesirable in applications where both high volume and high pressure are needed. Simply put, the solutions offered by these references do not work beyond a certain draft, and are essentially worthless. Finally, the above suggested solutions are invasive to the hull and expensive to implement on either an existing hull or a newly built hull. The solutions also create additional drag by adding wings outside the originally designed frame of the boat.

Furthermore, there are prior references which disclose an air injector, which is disposed in the stream of water going downwards and under the hull. Full scale experiments with a Japanese cement carrier vessel used precisely these prior art techniques and obtained only a 2-3% drag reduction.

Historically, it has been difficult to convince boat owners to allow their boats to undergo invasive modifications with no guarantee of any gain in efficiency. The bows of the larger carriers, as well as the majority of other types of boats have V-shaped bows that split the stream of incoming water sideways and away from the hull. In this design, the bubbles released in such streams end up mostly on the side of the vessel, with only a small amount washing under the hull. This small amount is typically insufficient to make a difference to the efficiency of the vessel. Even if a large volume of bubbles is released on the bottom of one of these ships in the bow region, these bubbles will quickly wash away and, if not replenished, these bubbles will only lubricate a fraction of the large and typically long hull. As such, the bubbles only lower the drag a small amount.

For smaller crafts, with shallower drafts and relatively short bodies, obtaining sufficient lubrication should be easier to obtain. However, such sufficient lubrication has not yet been achieved in the Prior Art. For example, U.S. Pat. No. 7,004,094 offers a lubrication solution that, when put into practice, is very cumbersome to implement, difficult to maintain, and inoperable. In short, in practice, U.S. Pat. No. 7,004, 094 either does not work or does not accomplish a sufficient lubrication for a small vessel.

Thus, what is needed is to provide the equivalent of a bubble layer or an air film in a manner that does not require active power input, or at least, very low power, and which has a strong chance of being retained at the submerged hull surface where it is needed to effectively reduce the drag of the vessel as it moves through the water.

The present invention offers solutions to these problems adapted to be used for either small vessels with a predictable shallow draft and relatively short hulls or large displacement vessels, with variable drafts and long hulls.

SUMMARY OF THE INVENTION

To minimize the limitations in the prior art, and to minimize other limitations that will become apparent upon reading and understanding the present specification, the present invention is a method and apparatus for providing air bubbles along the submerged hull of a nautical vessel such that drag is reduced as the vessel moves through the water.

One embodiment of the invention is an apparatus for reducing drag on a nautical vessel comprising: a channel; wherein the channel has one or more air injectors; a wide portion; wherein the wide portion is located at a bottom of the channel; a plurality of outlet holes; wherein a stream of water, generated by a nautical vessel's motion, enters the one or more air injectors and creates a depression that pulls an air into the stream of water; wherein the air is carried in the stream of water down the channel to the wide portion; wherein the stream of water and the air separate in the wide portion; wherein the air exits through the plurality of outlet holes; and wherein the apparatus is connected to a hull of a nautical vessel.

Preferably there is a plurality of channels. Alternatively, the air injectors may be fed air by an air fan.

The apparatus may further comprise a one or more bottom air injectors; a one or more bottom air injectors, wherein the stream of water, generated by the nautical vessel's motion, enters the bottom air injectors and creates a bottom depression that pulls an air that has not exited through the plurality of outlet holes into the stream of water creating a mixture of air bubbles and water. The mixture of air bubbles and water exits the bottom air injectors and lubricates a bottom of the nautical vessel. Alternatively, the one or more bottom air injectors provide additional pressure on the air such that the air is forced out of the plurality of outlet holes. The bottom air injectors may be fed by an air fan. The air exiting the plurality of holes preferably reduces a drag on a hull of a nautical vessel as the nautical vessel moves through a body of water. The stream of water and the air that is carried down the channel is directed into one or more air cavities and the air replenishes the air contained in the one or more air cavities.

The apparatus is preferably removably connected to the vessel hull.

Alternatively, the apparatus may be permanently attached to the vessel hull.

The vessel may be a small vessel.

Another embodiment of the invention is a drag reducing nautical vessel hull comprising: a hull; wherein the hull has a channel; wherein the channel is on a front portion of the hull; wherein the channel has one or more air injectors; a wide portion; wherein the wide portion is located at a bottom of the channel; a plurality of outlet holes; wherein a stream of water, generated by a nautical vessel's motion enters the one or more air injectors and creates a depression that pulls an air into the stream of water; wherein the air is carried in the stream of water down the channel to the wide portion; wherein the stream of water and the air separate in the wide portion; and wherein the air exits through the plurality of outlet holes.

The hull preferably has a plurality of channels. The air injectors may be an air fan.

The one or more air injectors may be on an adjustable frame that allows the one or more air injectors to be adjusted between a high water line and a low water line.

The drag reducing nautical vessel hull may further comprise one or more bottom air injectors. The bottom air injectors provide additional pressure on the air such that the air is forced out of the plurality of outlet holes. The bottom air injectors may be fed by an air fan. The air exiting the plurality of holes reduces a drag on a hull of a nautical vessel as the nautical vessel moves through a body of water. The stream of water and the air that is carried down the channel may be directed into one or more air cavities and the air replenishes the air contained in the one or more air cavities.

The nautical vessel may be a small vessel and the air injector may be on a bottom of the nautical vessel and just under the water line.

Another embodiment of the invention is a vessel hull bow adaptor that modifies the bow of a vessel such that it presents substantially horizontal surfaces on a transverse axis at the descending part of the bow such that air bubbles released by the air injectors are carried in vast amounts under the vessel's hull. These air bubbles lubricate the descending bow as well as the bottom of the vessel. The water inlets of the air injectors should be placed just under the water line in front of the bow or may even be imbedded in the bow, such that they do not protrude outside of the silhouette of the vessel seen from the incoming stream. In this manner the air injectors do not produce or generate additional drag. As such, there is no penalty, and no additional energy is wasted to generate the bubbles, beyond the energy needed to push the silhouette through water. Because the bow is lubricated by the bubbles as well, the effect of the lubrication substantially outweighs any impact from adding the invention to a vessel hull.

The drag reducing nautical vessel hull for a small vessel may have one or more air injectors that are adapted to fit onto a bow of the small vessel hull. The stream of water and the plurality of bubbles exits the one or more air injectors and flows down both the bow and the bottom side of said vessel hull, such that the plurality of bubbles lubricate both the bow and the bottom side of the vessel hull. Preferably, the low draft and slight slope of the bow easily allows this lubricating effect. Preferably the small craft has a smooth flat transversally slope for the bubbles to wash down and under.

Another embodiment of the invention is a drag reducing nautical vessel hull for a small vessel comprising: a vessel hull; wherein the hull has one or more air injectors and one or more outlet holes; wherein the one or more air injectors comprise one or more water inlets and one or more air inlets; wherein the one or more air injectors are located substantially at an underside of the vessel hull; wherein a stream of water, generated by a vessel's motion, enters the one or more air injectors through the one or more water inlets, which is located just under a water line, and creates a depression that pulls an air from the one or more air inlets into the stream of water; wherein a plurality of air bubbles are formed in the stream of water; wherein the stream of water and the plurality of air bubbles exits through the one or more outlet holes;

wherein the plurality of air bubbles lubricate the bottom side of the vessel hull as the vessel moves through the stream of water. The air that forms a plurality of air bubbles may be provided by an air fan. Preferably the nautical vessel in this embodiment is a small watercraft. A small watercraft may be as small, or smaller than, a single person water ski, small windsurf, surf, or kayak. Alternatively, the small watercraft may be much larger.

Another embodiment of the invention is a method of using the present invention to provide air bubbles to the bottom of a vessel through the present invention.

It is an object of the present invention to overcome the limitations of the prior art.

Another, and very important object of this invention, is to provide methods and devices for efficiently injecting high volumes of air bubbles capable of lubricating the bow as well as the bottom of a boat. This can be accomplished by adequately adapting the bow side of large vessels to guide the air bubbles released by an adjustable up and down frame that distributes the bubbles just under the waterline, downwards and along the bottom of the hull thus lubricating the descending bow and the bottom. The air releasing frame can be pulled out of water when stationed to prevent fouling. This kind of a detachable frame is preferably attached to barge or flat bottom vessels without any modifications of their hulls. The air releasing-slit may be incorporated in an adjustable frame or apron, adapted to be attached to half submerged vessels such as motor yachts and sail boats or it may fully incorporate air injectors as would be the case for wind surfs and other types of surfs, jet skis, or wave runners.

One of the problems that the present invention solves is how to produce the high volumes of bubbles needed and how to release the bubbles at the proper places so that they have the optimal lubricating effect. This lowers the friction coefficient between the boat hull and the water and this, lowers the resistance opposed to the boat hull as it moves through the water.

Another problem that the invention solves is how to place the bubbles along the bottom of a vessel without the aid of a high power consuming air compressor.

BRIEF DESCRIPTION OF THE DRAWINGS

FIG. 13 is an illustration of a side view of one embodiment of the invention and shows a bottom air injector.

FIG. 14 is an illustration of a side view of one embodiment of the invention and shows air cavities.

FIG. 15 is an illustration of a bottom view of one embodiment of the invention and shows air cavities.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, "Venturi Effect" or "Venturi pipe" refers to the well known concept of a reduction in fluid pressure that results when a fluid flows through a constricted section of tube, channel, or pipe. The constricted area causes a depression in the pressure which draws in higher pressure air into the lower pressure water. "Nautical vessel" refers to any craft, of any size, made out of any type of materials, which travels in or on any body of water, including, but not limited to rivers, streams, lakes, ponds, oceans, or seas. The term "air fan" refers to any low power motor that moves air, such as a blower, fan, or centrifugal fan. The term "air injector" refers to device that causes a depression in the water, such that adjacent air is sucked into the water in the form of bubbles. An air injector is well known in the art of the whirlpool industry.

Figure 1:
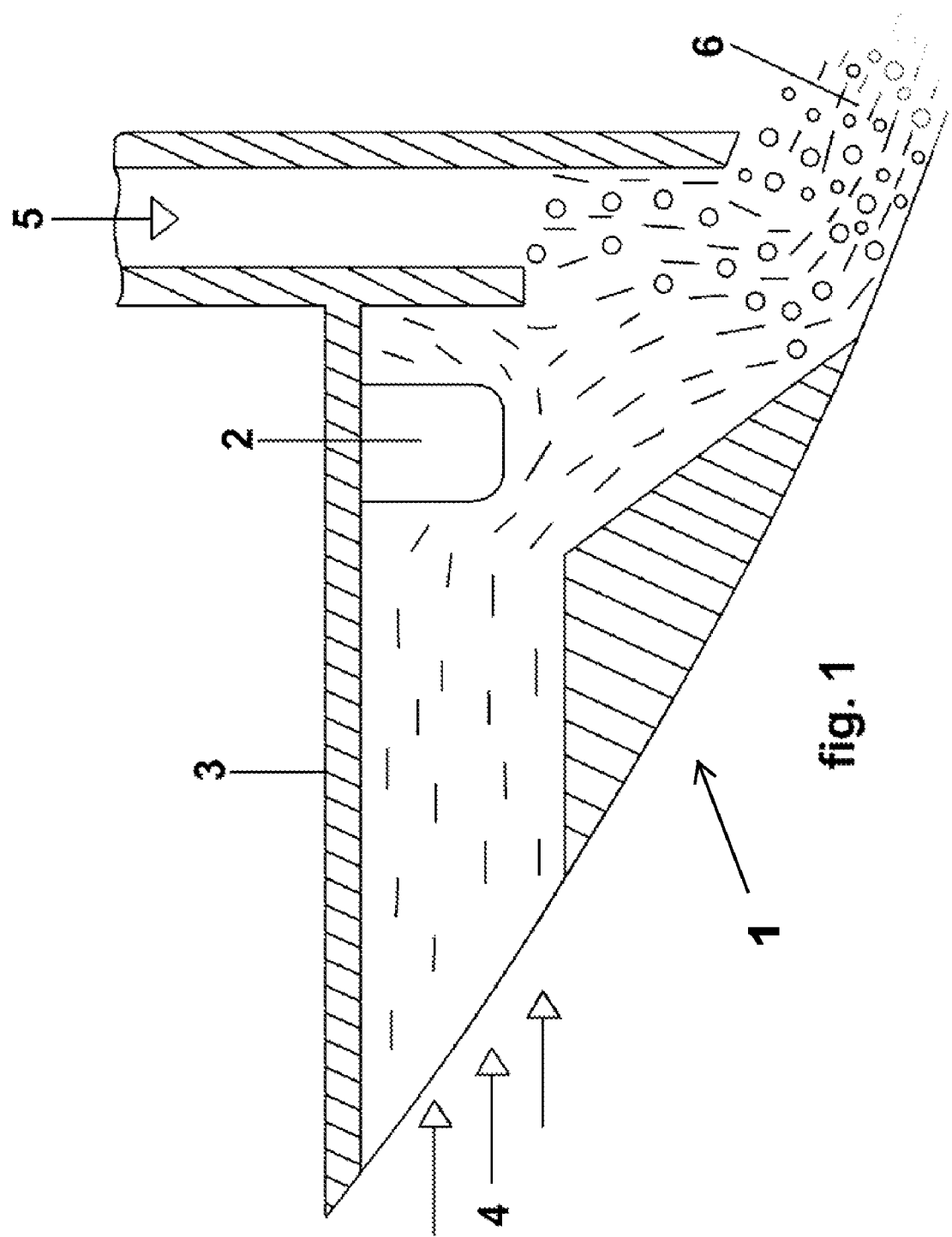
FIG. 1 is an illustration of an side view of one embodiment of the invention.

FIG. 1 is an illustration of an side view of one embodiment of the invention. As shown in FIG. 1, the invention preferably includes an air injector 1, which is preferably on the bow of vessel 3. Air injector 1 is preferably comprised of foil 2 (also known as a fin or a wing), water intake 4, and air inlet 5. As vessel 3 moves through the water, water comes in through water intake 4, hits foil 2, which creates a depression behind foil 2. This depression cause air, from air inlet 5, which has a higher pressure, to be sucked into the water in the form of bubbles. Preferably the bubbles are microbubbles. As shown in FIG. 1, the mixture of water with air bubbles 6 exits the air injector 1.

Alternatively, the air injector may be a Venturi pipe (or tube) in which water enters through a wide opening, gets squeezed in a narrow portion where a depression is created, air is drawn in from a provided air intake, and a mixture of water with air bubbles exits the enlarged exit.

Another way of mixing high volumes of air in a stream of water is by using an air fan to push air through a screen, or multitude of small holes, in a moving stream of water. The use of standard air compressors is undesirable because they are very inefficient at producing high volumes of air.

The use of air fans is feasible where there are already engines powering the vessels, to which driving an additional air fan with low power consumption would not be a problem. But for small craft like windsurfs, surfs, water skis, or sail boats, the foil air injector shown in FIG. 1 is preferred. The air injector may be any passive air injection system.

Figure 2:
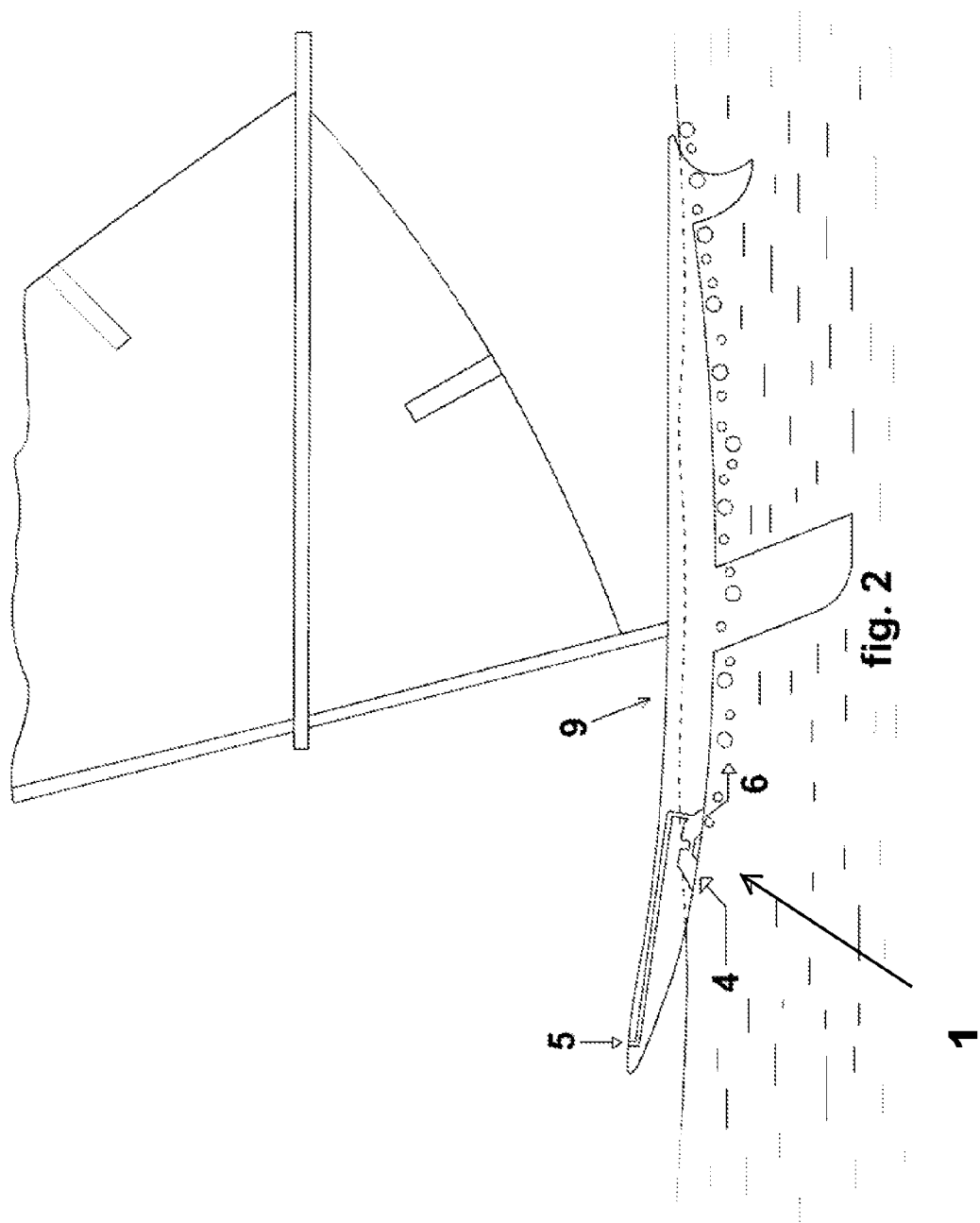
FIG. 2 is an illustration of a side view of one embodiment of the invention as used with a small vessel.

FIG. 2 is an illustration of a side view of one embodiment of the invention as used with a small vessel. FIG. 2 shows the invention wherein one or more air injectors may be integrated into the bow of a small vessel 9, such as a windsurf. As shown in FIG. 2, the water enters water intake 4 of air injector 3. Air injector 3 may be a foil air injector or a Venturi pipe. Air from air inlet 5 is sucked into the water in the form of microbubbles. FIG. 2 shows how the air bubbles in the mixture of water and air 6 wash under the craft and stay under the craft the whole length. The bubbles do not have time to wash sideways.

Figure 3:
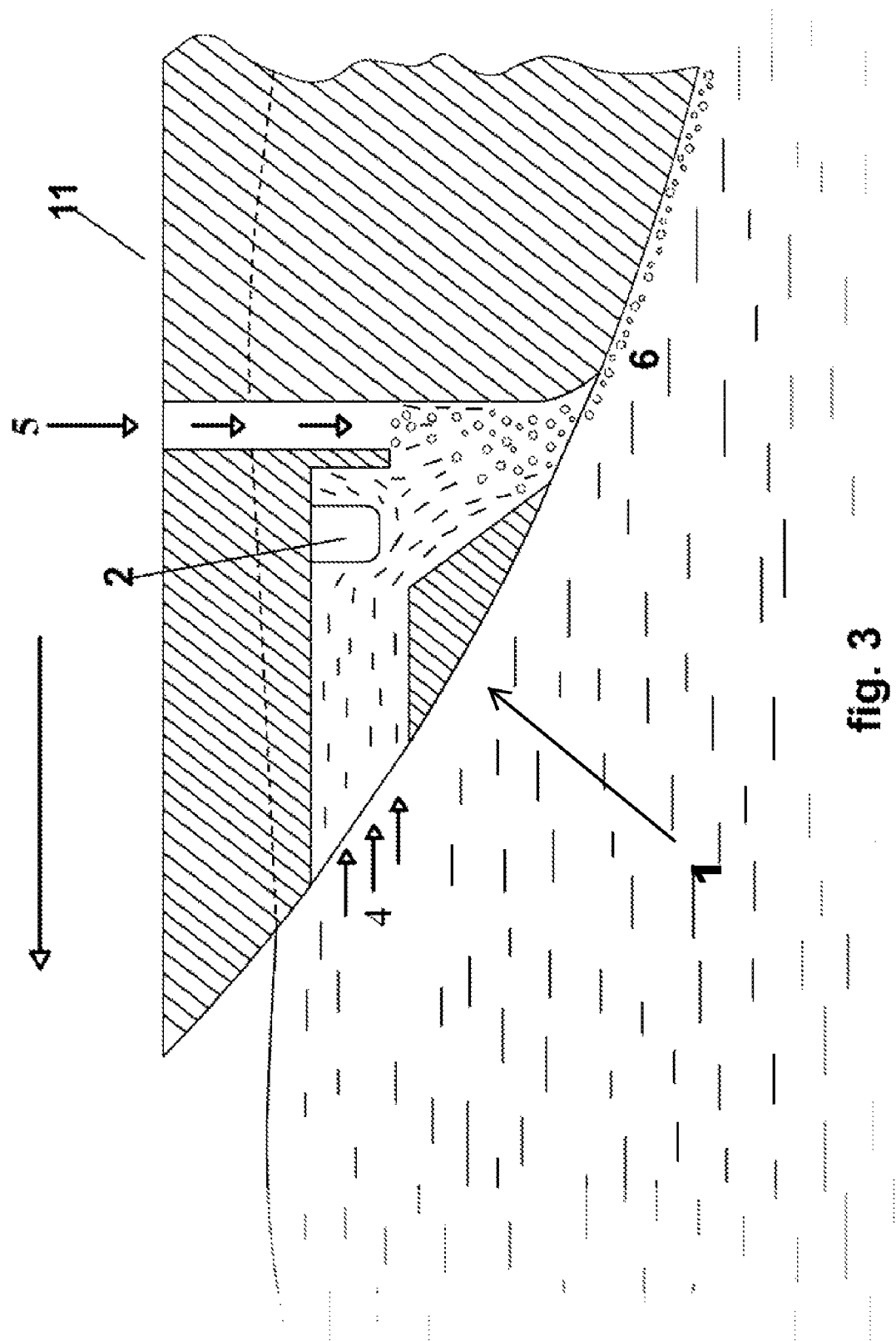
FIG. 3 is an illustration of a side view of one embodiment of the invention.

FIG. 3 is an illustration of a side view of one embodiment of the invention. As shown in Figure three the invention may be part of small vessel 11, and preferably includes an air injector 1. Air injector 1 is preferably comprised of foil 2 (also known as a fin or a wing), water intake 4, and air inlet 5. The water intake is preferably placed just under the water line. As small vessel 11 moves through the water, water comes in through water intake 4, hits foil 2, which creates a depression behind foil 2. This depression cause air, from air inlet 5, which has a higher pressure, to be sucked into the water in the form of bubbles. Preferably the bubbles are microbubbles. As shown in FIG. 3, the mixture of water with air bubbles 6 exits the air injector 1. For small craft, including sailboats, which are both relatively short and have a shallow draft, an efficient lubrication may be attained by either imbedding a one or more (preferably a plurality) of passive air injectors 1 just under the water line at the bow of a small craft, or having a shield or apron like structure containing the air injectors affixed in the bow area of the craft, such that the exiting stream of air bubbles in water mixture washes along the majority of the hull, lubricating its motion. One of the advantages of the small craft is the fact that the vessel has a relatively constant draft and, therefore, the place to set the plurality of injectors on the bow is the same, just under the water line, in the same position.

On the other hand, in the case of large displacement ship or barge, there is a large difference in draft from empty to full. Since the air injectors are preferably just under the water line (for efficient generation of microbubbles and so that high static pressures do not have to be overcome) the use of either a movable frame, containing the air injectors, must be able to move up and down depending on the draft/waterline, or a multitude of air injectors should be dispersed along the entire range of possible drafts. The multitude of air injectors just under the water line are preferably activated and the air injectors above the water line are deactivated.

Figure 4:
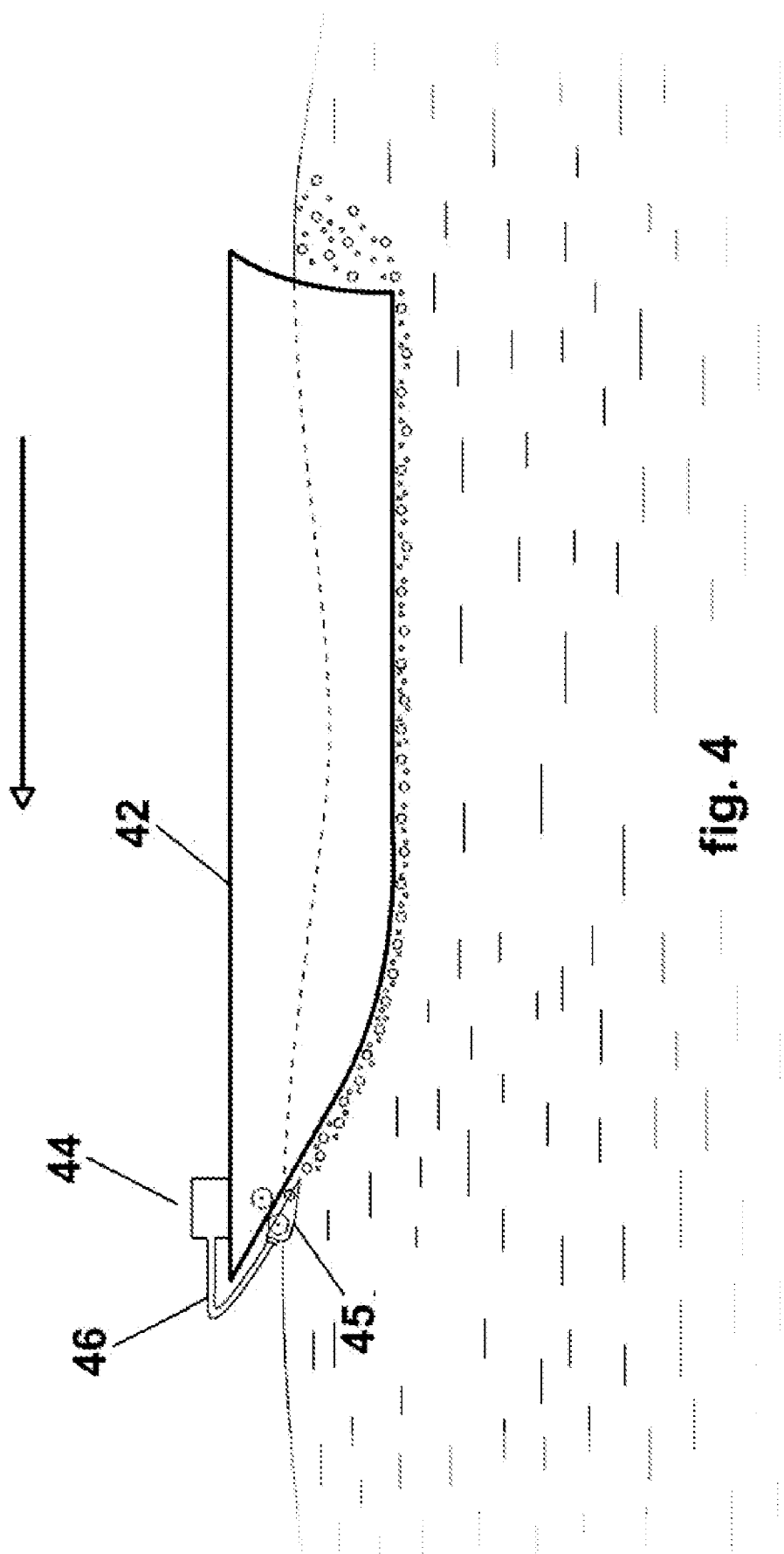
FIG. 4 is an illustration of a side view of one embodiment of the invention with an air fan.

FIG. 4 is an illustration of a side view of one embodiment of the invention with an air fan. As shown in FIG. 4, the invention may include a movable frame 45, which preferably is comprised of one or more air injectors. The air may be fed to the air injector by air fan 44 through pipe 46. These one or more air injectors are preferably spread along a line across the bow of a vessel 42, which is preferably a barge. The frame 45 preferably may be adjusted up or down, depending on the draft of vessel 42. This allows the air injectors to be set to just under the water line before the barge is set to sail. A rack and pinion mechanism can be used to adjust the frame 45 up or down. The rack and pinion system is merely an example, and is not meant to restrict by any means the various mechanical solutions by which this motion can be accomplished. Typically, barges have a wide descending bow with a high rake, which means a low angle of incidence with the water line. This makes a barge an excellent type of vessel to be fitted with the present invention. With barges, most of the incoming water stream washes under the flat hull bottom. This is unlike other types of vessels that split the stream of water mostly sideways. Even with a flat bottomed barge, the air bubbles mixed in the water stream may wash sideways along the way, and thus only lubricate efficiently the bow and that portion of the flat bottom that is close to the bow. The effect of the lubrication may be gradually less efficient further towards the stern, due to the length of the barge. Despite the loss of bubbles sideways, full scale tests of this embodiment of the invention on a 50 foot by 135 foot barge with a three foot draft produced a reduction of 15% in drag.

Figure 5:
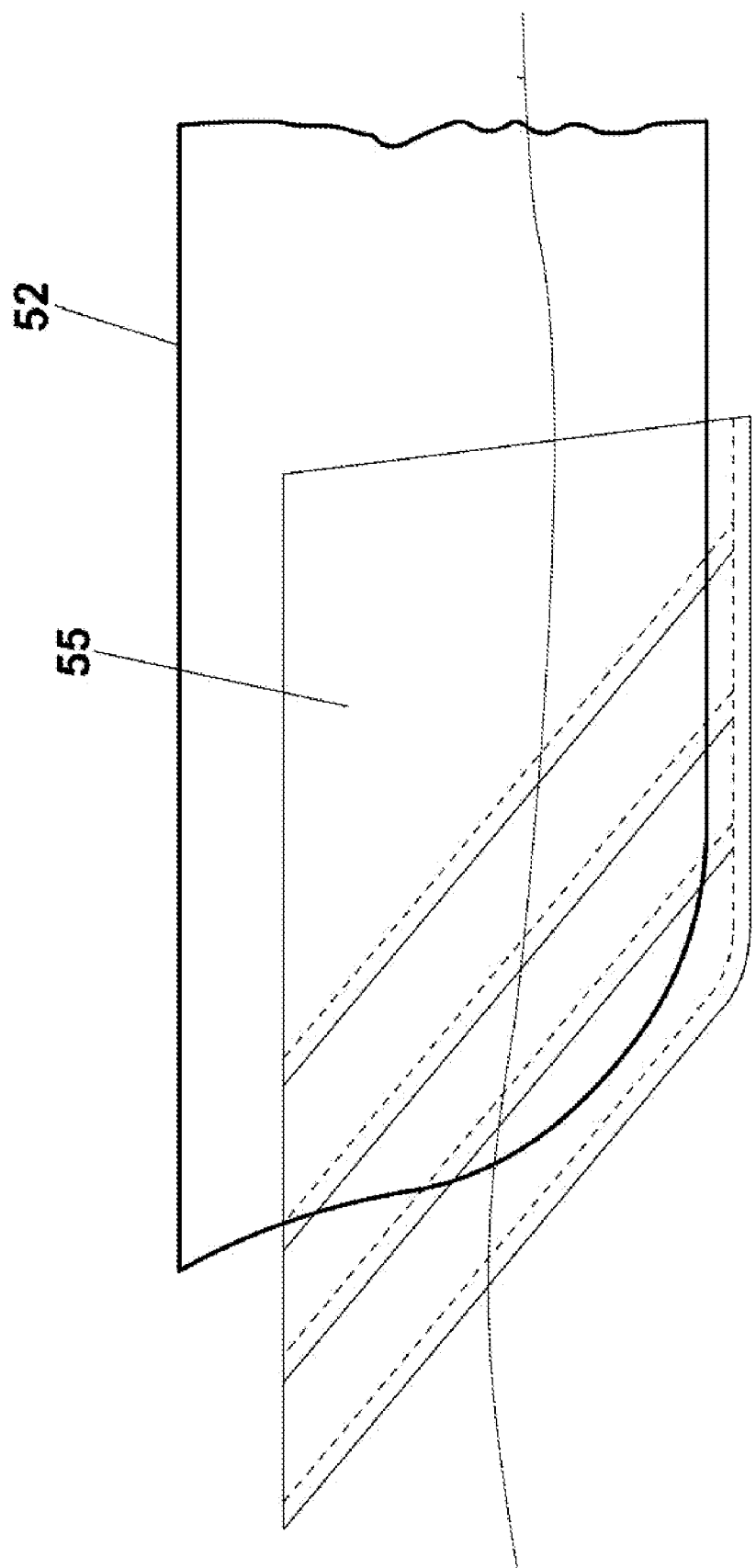
FIG. 5 is an illustration of a side view of one embodiment of the invention and shows a side by side array of the present invention on a bow of a vessel.

FIG. 5 is an illustration of a side view of one embodiment of the invention and shows a side by side array of the present invention on a bow of a vessel. FIG. 5 shows vessel 52 with a plurality of present invention apparatuses 55 arrayed along the bow. Air bubbles tend to surface because they are pushed by their own buoyancy. As such, releasing the bubbles merely in front of a standard V-shaped bow vessel does not accomplish an efficient lubrication of the underside of the vessel, because the stream of water carrying the bubbles is split on the port and starboard sides. This carries the bubbles away from the hull. FIG. 5 shows that V-shaped vessel 52 may be fitted with a plurality of apparatuses 55. This allows the air bubbles in the water and air mixture to be placed along the entire bow of the vessel.

Figure 6:
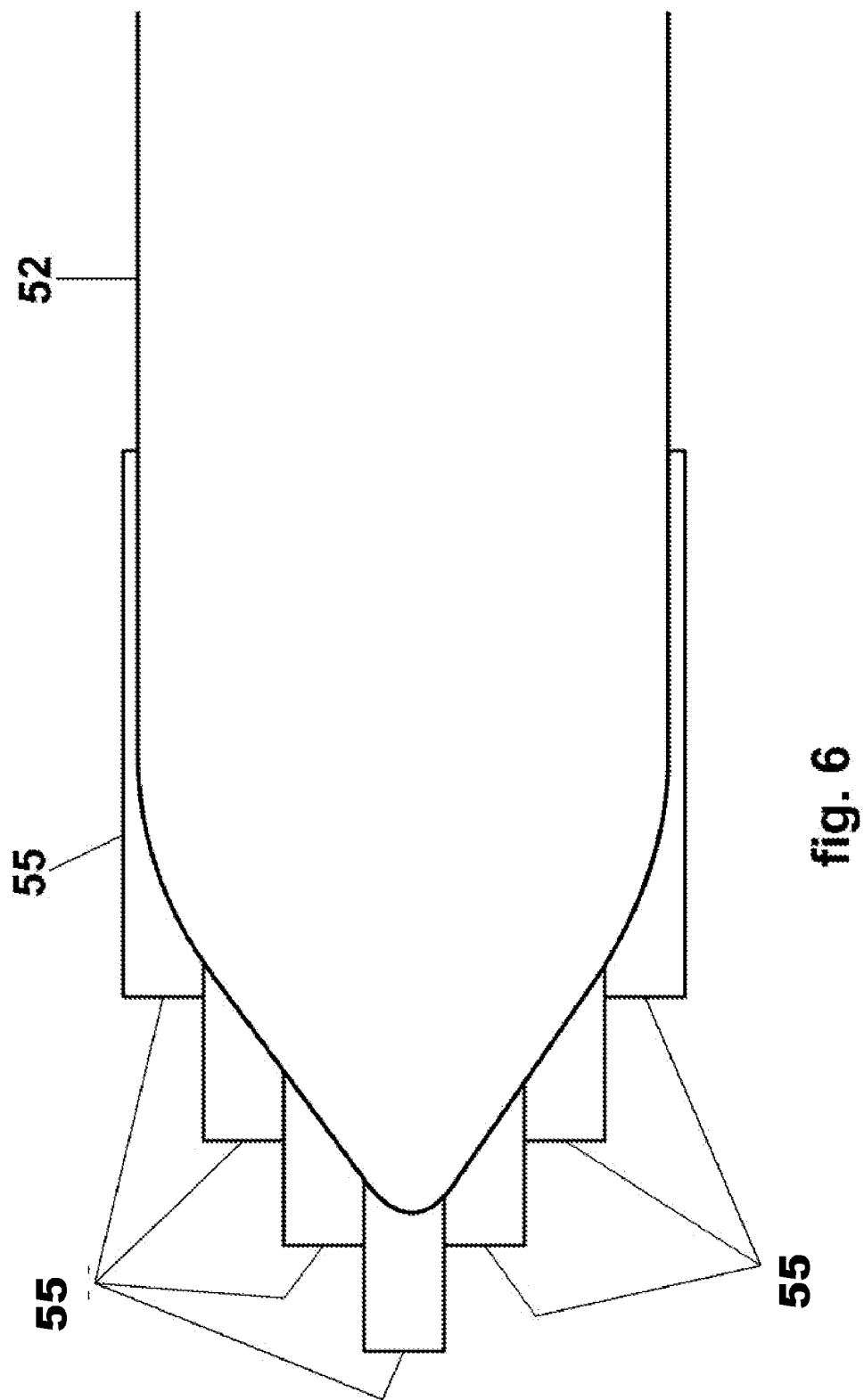
FIG. 6 is an illustration of a top view of one embodiment of the invention and shows a side by side array of the present invention on a bow of a vessel.

FIG. 6 is an illustration of a top view of one embodiment of the invention and shows a side by side array of the present invention on a bow of a vessel. As shown in FIG. 6, the present invention may be a plurality of apparatuses 55 that may be arrayed along the width of the bow of V-shaped vessel 52.

Figure 7:
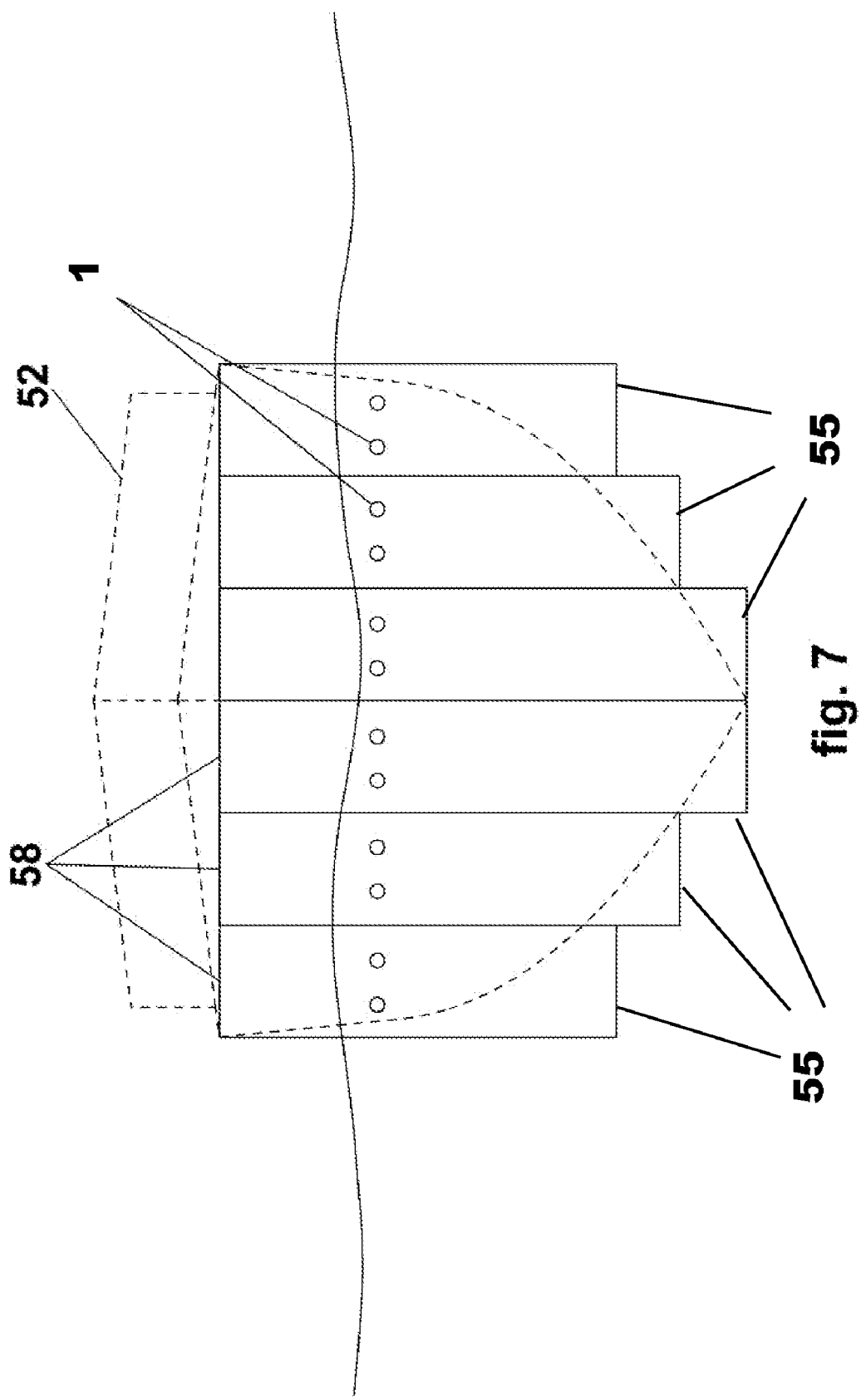
FIG. 7 is an illustration of a front view of one embodiment of the invention with a side by side array of the present invention on a bow of a vessel.

FIG. 7 is an illustration of a front view of one embodiment of the invention with a side by side array of the present invention on a bow of a vessel. As shown in FIG. 7, each of the plurality of apparatuses 55 and 58 have air injectors 1. These air injectors 1 are kept substantially under the water line, lubricating the descending part of the hull as well as the bottom of the hull. FIG. 7 also shows how the horizontal surfaces are continued under the bow to keep the bubbles from migrating sideways prematurely.

Figure 8:
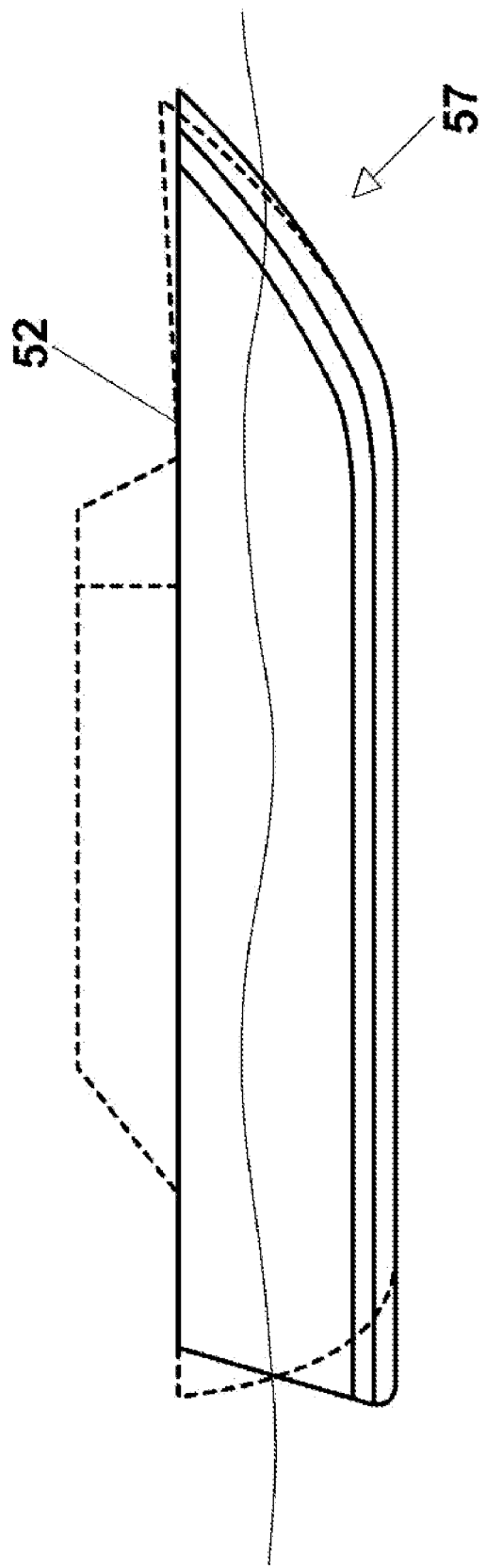
FIG. 8 is an illustration of a side view of one embodiment of the invention.

FIG. 8 is an illustration of a side view of one embodiment of the invention. FIG. 8 shows how the horizontal surfaces 55 are continued under the hull to keep the bubbles from migrating sideways prematurely along vessel 52. The dashed line shows the original silhouette of vessel 52.

As shown in FIGS. 5-8, the apparatuses 55 with embedded air injectors 1 may be affixed to existing vessel 52 to modify the vessel's bow for making it more appropriate and receptive to air bubble lubrication, especially for smaller craft, like sail boats that have a predictable draft and are short enough for the bubbles to last and lubricate the entire boat from bow to stern.

The apparatuses 55 can have one wide bow like a profile instead of several side by side profiles as shown. This single profile is preferably wide enough to cover the width of vessel 52 and may be affixed in front of the existing bow like a shield. This will enable the generation of air bubbles for the whole width and length of the vessel.

The use of such attachable apparatuses 55 is desirable because with a small investment, and without physically changing the actual vessel, an immediate and substantial improvement in fuel efficiency of the vessel may be achieved. Additionally, since the efficiency is determined by the apparatuses 55, only the apparatuses 55 need to be updated when an improvement is made.

The present invention is easily implemented in smaller vessels with a fixed and predictable drag and relatively short hulls. Although the invention is also available to larger vessels, the long hulls and variable drafts of the vessels may make implementing the present invention more difficult. This is because the longer the vessel, and the deeper the vessel sits in the water, the more likely the air bubbles will escape sideways. This can be corrected by replenishing the air bubbles every so often with additional air bubbles. The present invention allows the air bubbles to be replenished without the need for an air compressor, which would be cost prohibitive.

Figure 9:
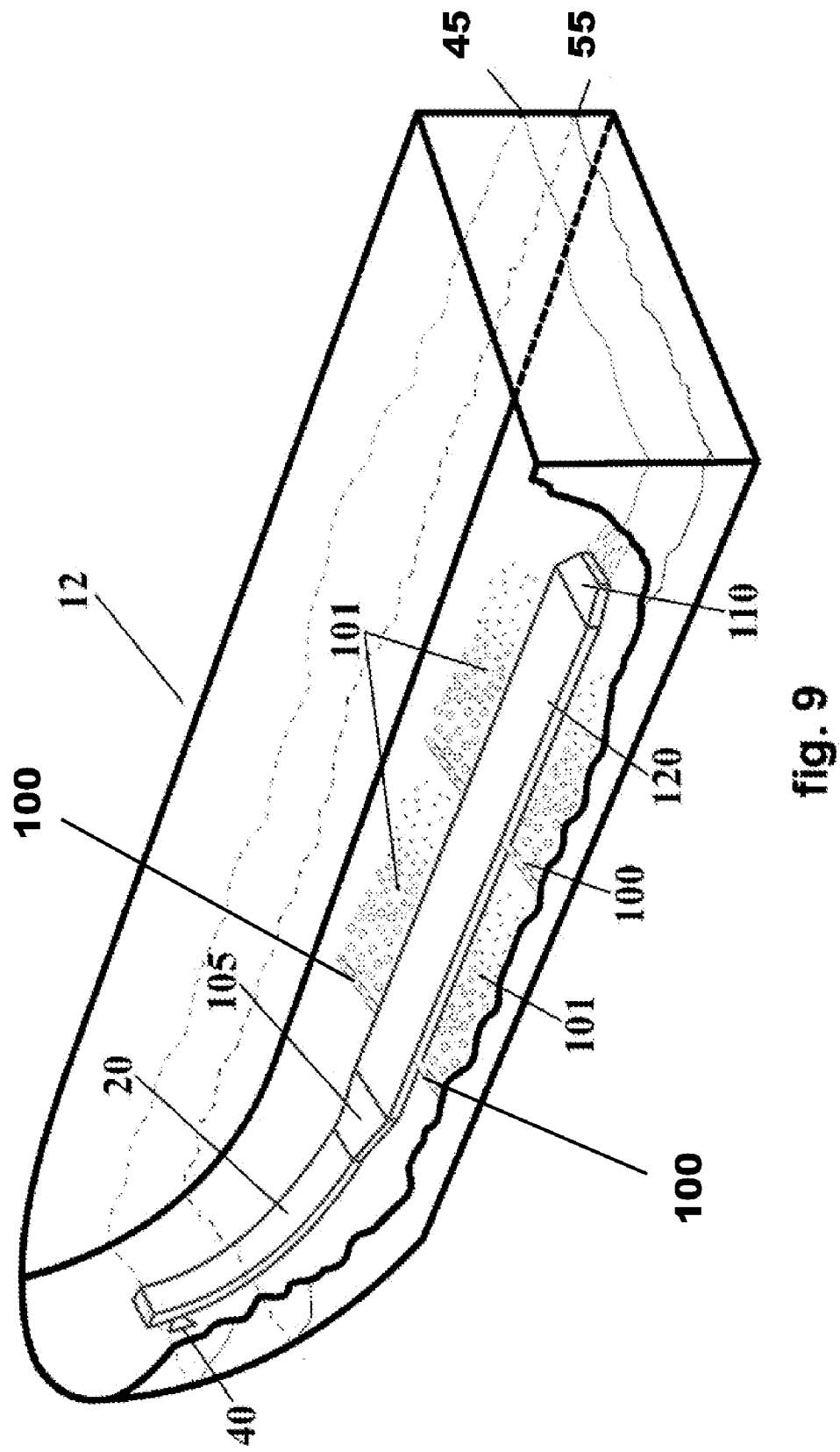
FIG. 9 is an illustration of a perspective cut-away view of one embodiment of the invention.

FIG. 9 is an illustration of a perspective cut-away view of one embodiment of the invention. FIG. 9 shows a preferred embodiment of the invention as an apparatus for reducing drag on a nautical (displacement or large) vessel 12 comprising: a descending channel 20, one or more air injectors 40, a plurality of outlet holes 100, a wide portion 105, a water outlet 110, and a bottom pipe 120. The apparatus is preferably connected to or part of the front side of the nautical vessel. The channel 20 has air injectors 40 in front of it just under the water line. The air injectors 40 receive a stream of water, cause air to mix into the water, as shown in FIG. 1, in the form of air bubbles. The air injectors 40 can be adjusted so that they are just under the water line. For example, the water line may be at a high level 45 when vessel is full of cargo, and at low level 55 when empty. The water and air mixture is then carried down the channel with the opening oriented forward, similar to what is shown in FIG. 4. The flat bottom of the channel replicates the flat bow of the barge, but may be limited to the width of the channel. Because the buoyancy of the air microbubbles is easily overcome by the force of the descending water stream down channel 20 generated by the boat's forward motion, the air microbubbles are driven down to the bottom of vessel 12. At the bottom, channel 20 closes and becomes bottom pipe 120. Where the channel closes becoming a pipe, it enlarges at wide section 105 such that the stream of water with air bubbles slows down, allowing the bubbles to separate on top of water trapped in the horizontal enlarged bottom section 120. Here, the air has the pressure of the water under it. As such, a high volume of compressed air is now trapped at the bottom of vessel 12. This air is preferably capable of exiting as air microbubbles 101 through a plurality of outlet holes 100. The outlet holes 100 are preferably conveniently distributed along the vessel's bottom. The water exits towards stern through water outlet 110. The pipes or tubes with the air outlet holes 100 preferably have a hydrodynamic profile for offering as little additional drag as possible. It should be understood that the high volume of compressed air is by this method and apparatus readily available to be used for lubricating the bottom of the hull of vessel 12 as desired by using the stream of water that would have washed down the bow of vessel 12 anyway. This air is carried down without any additional energy consumed in the process. In fact, for the surface covered by the descending channel 20, the descending stream of water is additionally lubricated by the very air bubbles it carries, thus, providing an additional savings in fuel consumption.

Because the amount of air carried to the bottom, and compressed in the process, is dependent of the size of the channel, at a void ratio of close to 50%, vast amounts of air may be disposed down to the bottom of vessel 12 for lubricating not only vessel 12, but also any following vessels, as in a train of barges. By accumulating the additional or excess compressed air generated at the bottom of vessel 12, such as in a storage tank that may be kept anywhere on vessel 12, the compressed air may be distributed to the following barges, or later parts of a very long vessel, which may not be able to benefit from the incoming stream.

Figure 10:
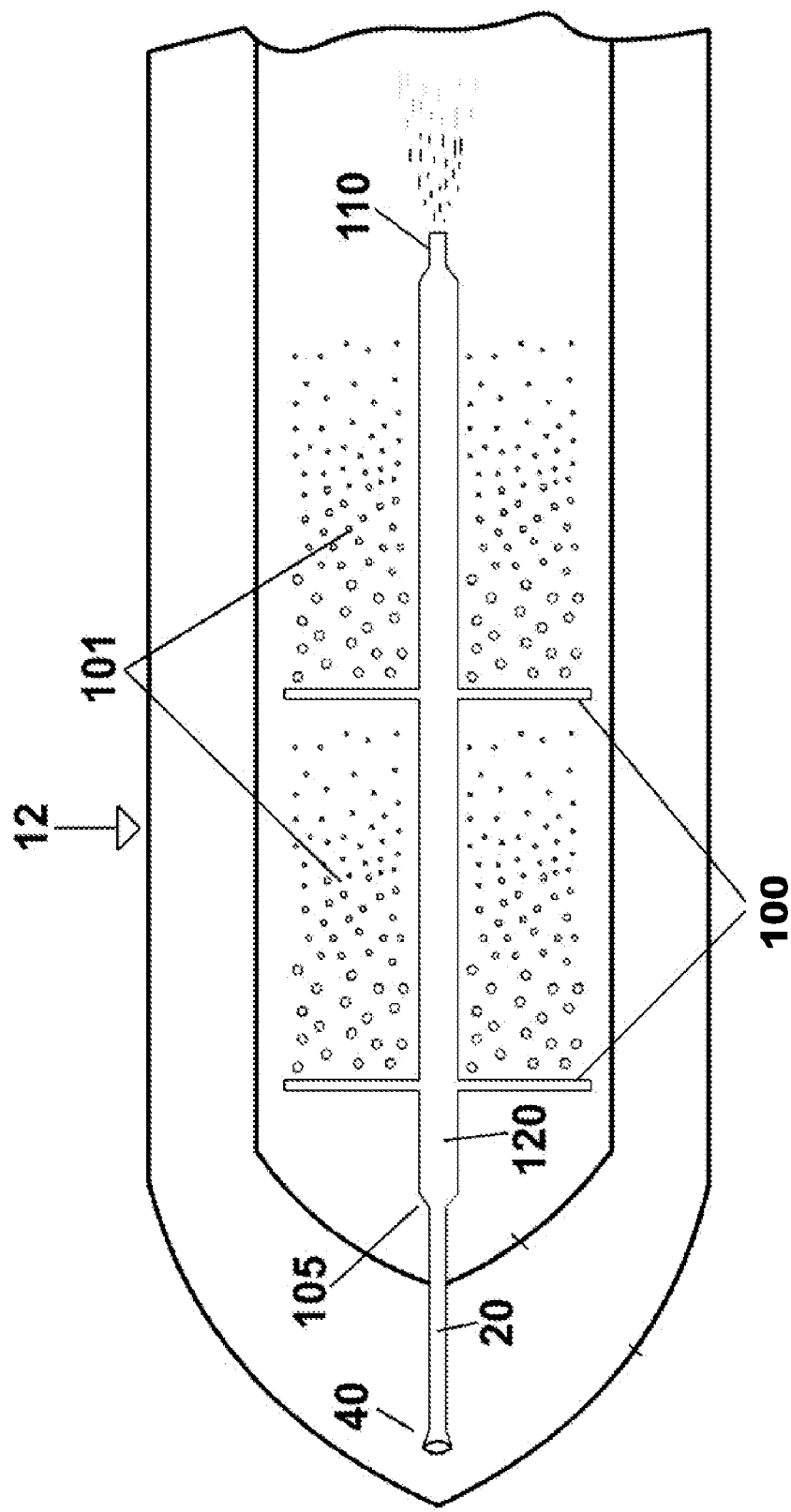
FIG. 10 is an illustration of a bottom view of one embodiment of the invention.

FIG. 10 is an illustration of a bottom view of one embodiment of the invention. FIG. 10 shows a preferred embodiment of the invention as an apparatus for reducing drag on a nautical vessel 12 comprising: a descending channel 20, one or more air injectors 40, a plurality of outlet holes 100, a wide portion 105, a water outlet 110, and a bottom pipe 120. The wide portion 105, also called the lower section, is wider than the channels that feed the wide portion 105. FIG. 10, illustrates how the present invention may be used to easily modify existing vessels to incorporate the benefits of the reduction in drag. Preferably, the invention is self contained, and no drilling or cutting of existing vessel structures is necessary. The invention may be attached to a vessel during a routine dry dock maintenance, which makes the invention not only economically feasible but advantageous. It should also be understood that the invention may be incorporated into a new vessels hull during construction of the vessel.

Figure 11:
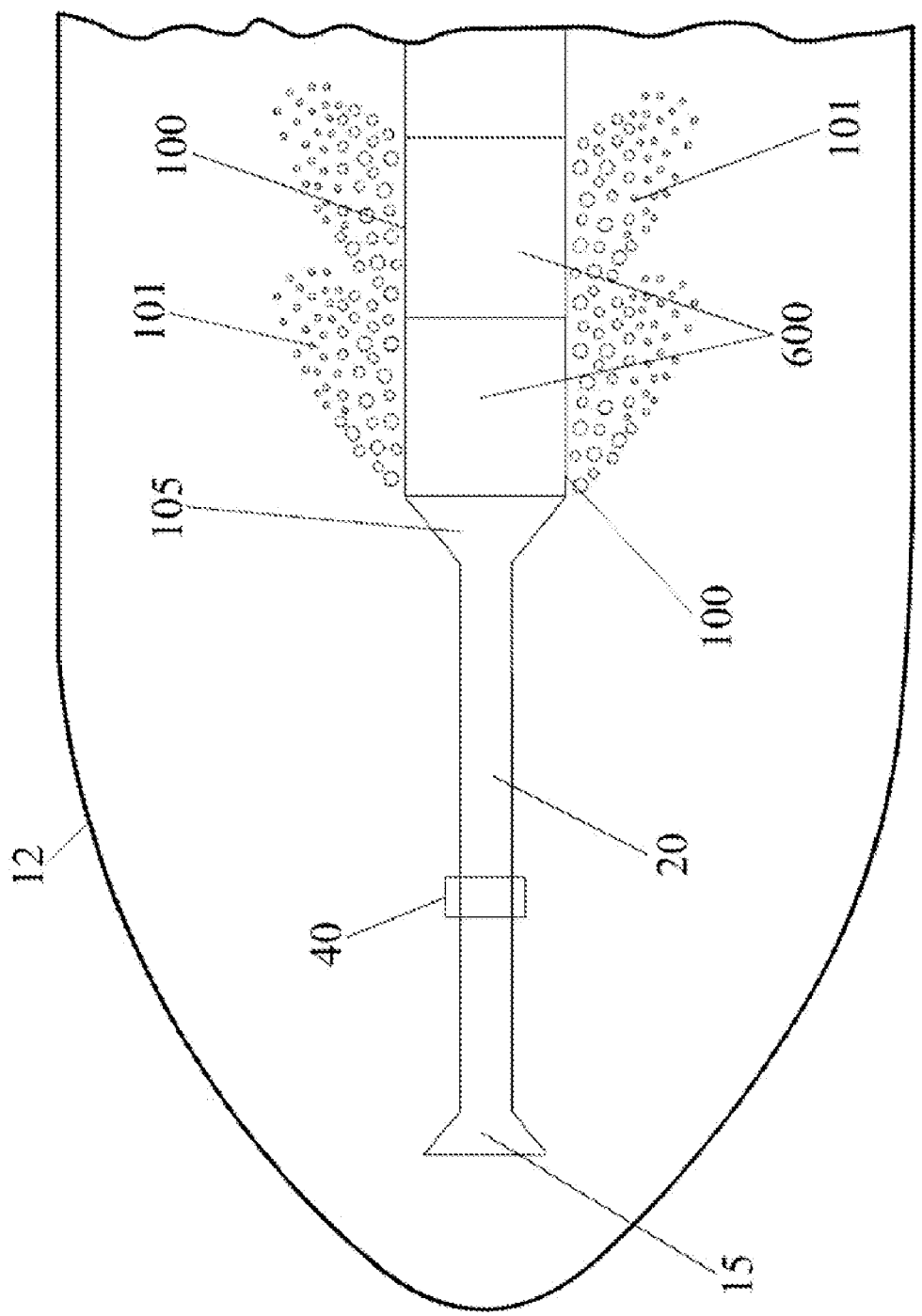
FIG. 11 is an illustration of a bottom view of one embodiment of the invention and shows a modular configuration.

FIG. 11 is an illustration of a bottom view of one embodiment of the invention and shows a modular configuration. FIG. 11 shows a preferred embodiment of the invention as an apparatus for reducing drag on a nautical vessel 12 comprising: a descending channel 20, one or more air injectors 40, a plurality of outlet holes 100, a wide portion 105, and modular units 600. The modular units 600 are preferably prefabricated, and can be linked to fit any vessel of any size. FIG. 11 also shows how the modular units may have outlet holes on the sides to more easily accommodate the release of air microbubbles 101.

Figure 12:
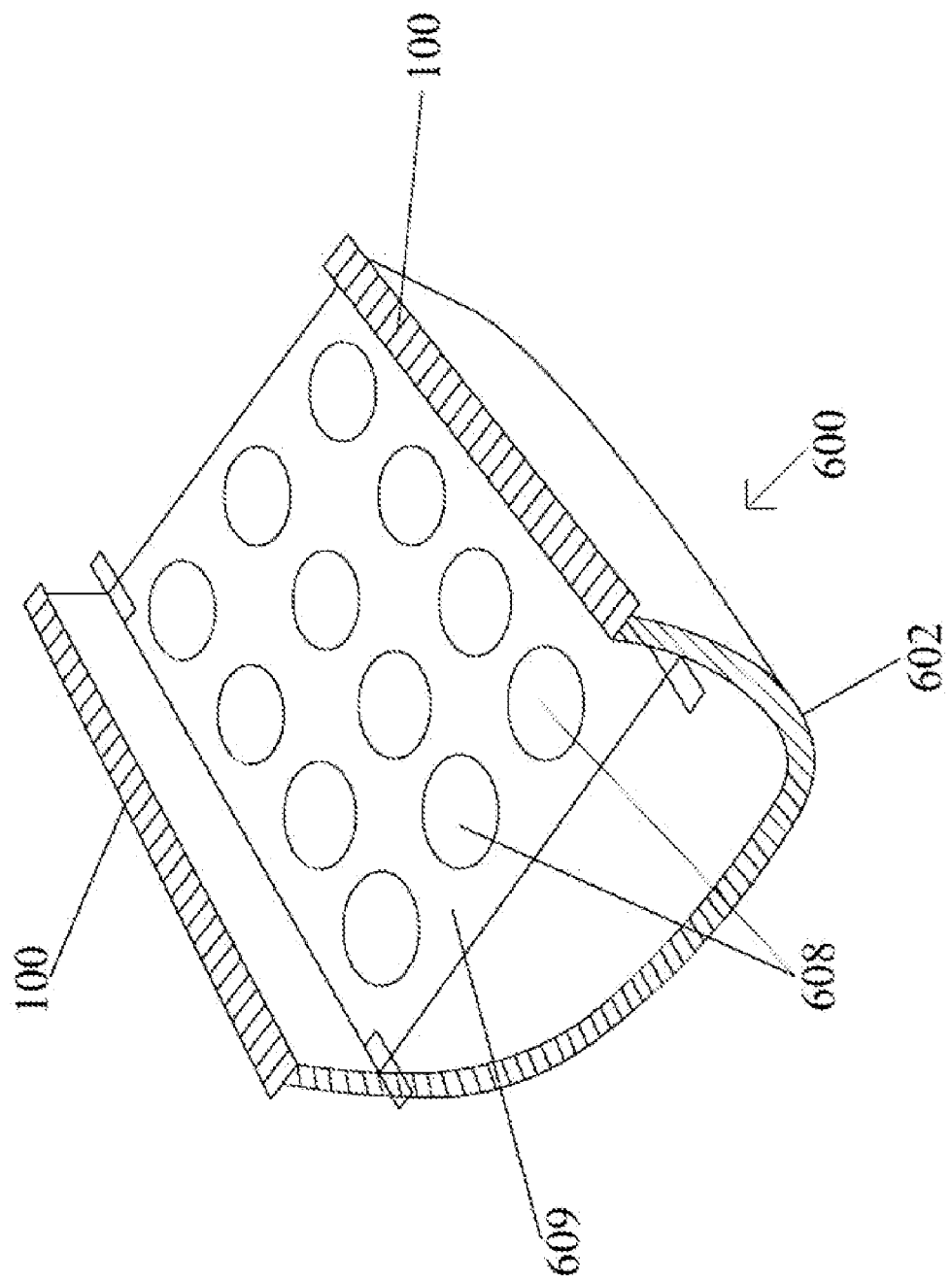
FIG. 12 is an illustration of a perspective view of a modular unit of one embodiment of the invention.

FIG. 12 is an illustration of a perspective view of a modular unit of one embodiment of the invention. FIG. 12 is a detailed illustration of a preferred embodiment of module 600 where 602 is the outer body of a module, which may also form the enlarged bottom pipe 120 (as shown in FIG. 10), 609 is a grill with perforations 608 allowing air to separate from the water stream running under it. The modular units 600 are preferably punched and bent outwards when affixed to the bottom of the hull of vessel 12 to form air outlets 100. The air outlets should be designed preferably to be self cleaning or easily cleanable against fouling.

As shown in FIGS. 9-12, the invention may be attached to the unmodified hulls of existing vessels, and therefore it may protrude outward or downward. As such, the compressed separated air may be at a higher elevation than the water underneath it. This may mean that the air may have a pressure slightly higher than the surrounding water at the bottom of the hull, which is at a higher elevation and lower static pressure, and, therefore, the microbubbles will exit through air outlet holes 100, which are preferably situated on the bottom of the hull. It should also be understood that even the outside of bottom pipe 120 may be lubricated by releasing bubbles at higher elevation, slightly ahead of wide portion 105 (after the pipe has been enclosed). Indeed, the bubbles may be released anywhere deemed desirable at equal or higher elevations than the bottom of the hull. From there, the air bubbles will conveniently wash down with the stream of water.

Alternatively, it should be understood that if the invention is part of a new hull, it may be intrude in the vessel hull and the invention will still effectively lubricate the bottom of the hull with air bubbles.

FIG. 13 is an illustration of a side view of one embodiment of the invention and shows a bottom air injector. As shown in FIG. 13, the invention is preferably apparatus for reducing drag on a nautical vessel 12 comprising: a descending channel 20, one or more air injectors 40, a plurality of air injector outlet holes 100, a bottom pipe 12, and one or more bottom air injectors 299. Bottom air injectors 299 preferably include a water intake 300 and an air intake 305. If the invention is to be incorporated into the hull of a newly built vessel, the compressed air will separate at slightly higher elevation than the bottom of the hull (due to the preferred intruding configurations of the channels and pipes) and the air bubbles may need a small pressure differential to wash out of outlet holes 100. This pressure differential is preferably made up by interposing air injectors, similar to the air injectors shown in FIG. 1. As shown in FIG. 13, the water intake 300 draws water into air injector 299, a depression is formed and air is sucked down from air intake 305, from the compressed air in bottom pipe 120. The air bubbles then wash out of air injector outlet holes 100 to lubricate the bottom of the vessel. Similarly, a Venturi or any other air injecting system can be used taking its air from the already compressed air in bottom pipe 120. Alternatively, an air fan may be used by having the intake from the bottom pipe 120 and output it to screens or other outlets at the bottom of the hull.

FIG. 14 is an illustration of a side view of one embodiment of the invention and shows air cavities. FIG. 14 shows another preferred embodiment of the invention as an apparatus for reducing drag on a nautical vessel 12 comprising: a descending channel 20, one or more air injectors 40, air cavities 500 and 502, air outlet pipe 510, and adjusting valve 520. In this embodiment the channels 20 preferably bring the mixture of air bubbles in the water stream to one or more air cavities 500 where the air bubbles 101 will separate on top of the water forming the pockets of air 501. As vessel 12 moves through the stream of water, the water gradually washes out the air trapped in the air cavities 500. It is well known in the art that air pockets, such as pockets of air 501, on the bottom of a nautical vessel, reduce friction between the bottom of a hull of a vessel 12 and the surrounding water. The present invention easily provides a steady source of air to replenish the air that is washed out of the air cavities 500 as the vessel 12 moves through the water. Moreover, as air is washed out of air cavities 520, the air is replaced by air 540, which is washed out of air cavities 500. Preferably as the air washes out of the bow air cavities, it flows towards to the stern to fill subsequent air cavities. In order to avoid having the washed out air interfere with the propeller, the air is preferably released up and out of pipe 510. The release of the air is controlled by adjusting valve 520.

The apparatus may be removable connected to the vessel hull or it may be permanently attached to the vessel hull. Like in the previously mentioned shield, shown in FIGS. 5-8, it is typical to try several configurations of the invention on vessels without an invasive procedure to establish the best solution before applying it to newly built vessels.

FIG. 15 is an illustration of a bottom view of one embodiment of the invention and shows air cavities. FIG. 15 shows an embodiment of the invention as an apparatus for reducing drag on a nautical vessel 12 comprising: a plurality of descending channels 20, two air injectors 40, air cavities 500, and air cavities 540. FIG. 15 shows how the air 540 washes out of air cavity 500 into air cavity 540.

As shown in FIG. 15, there is preferably a plurality of air cavities symmetrically disposed relative with the central longitudinal axis of the vessel. Additionally there are preferably multiple cavities along the length of the vessel. With this configuration, the air will be washed from the bow cavities into the next ones towards the stern. As such it is the bow cavities that need replenishing. The replenishing may be accomplished by the apparatus and method of the present invention.

It should be understood that this invention may work with any number channels and apparatuses.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. An apparatus for reducing drag on a nautical vessel comprising:
    one or more open channels;
    one or more air injectors;
    one or more enclosed lower sections;
    wherein said apparatus is connected to a hull of a nautical vessel;
    wherein said one or more open channels are on a front of said hull;
    wherein said one or more enclosed lower sections are wider than said one or more open channels;
    wherein said one or more enclosed lower sections are located at a bottom of said one or more open channels and wherein said one or more lower sections are substantially on a bottom of said hull of said nautical vessel;
    a plurality of outlet holes intermediate each of said open channels and a rear end of respective one of said enclosed lower sections;
    wherein a stream of water, generated by a nautical vessel's motion, enters said one or more air injectors and creates a depression that pulls an air into said stream of water;
    wherein a plurality of air bubbles are formed in said stream of water;
    wherein said plurality of air bubbles is carried in said stream of water down said one or more open channels to said one or more enclosed lower sections;
    wherein said stream of water and said plurality of air bubbles slow down and separate within said one or more enclosed lower sections such that said plurality of air bubbles forms a separated volume of compressed air that is above and compressed by said stream of water;
    wherein said separated volume of compressed air has a pressure greater than an external water pressure, which allows said separated volume of compressed air to exit through said plurality of outlet holes as a plurality of microbubbles.

2. The apparatus for reducing drag on a nautical vessel of claim 1, wherein there at least two of said one or more open channels.

3. The apparatus for reducing drag on a nautical vessel of claim 1, wherein said one or more air injectors are fed air by an air fan.

4. The apparatus for reducing drag on a nautical vessel of claim 1, further comprising:
a one or more secondary bottom air injectors;
wherein said stream of water, generated by said nautical vessel's motion, enters said one or more secondary bottom air injectors and creates a bottom depression that pulls said volume of compressed air that has not exited through said plurality of outlet holes into said stream of water creating a secondary mixture of air bubbles and water;
wherein said secondary mixture of air bubbles and water exits said one or more secondary bottom air injectors and lubricates a bottom of said nautical vessel.

5. The apparatus for reducing drag on a nautical vessel of claim 1, wherein said plurality of microbubbles exiting said plurality of outlet holes are released along the length of a bottom of said hull and reduce a drag on a hull of said nautical vessel as said nautical vessel moves through a body of water.

6. The apparatus for reducing drag on a nautical vessel of claim 1, wherein said stream of water and said plurality of air bubbles that is carried down said one or more open channels is directed into one or more air cavities and said plurality of air bubbles replenishes a pocket of air contained in said one or more air cavities.

7. The apparatus for reducing drag on a nautical vessel of claim 1, wherein said apparatus is removably connected to said vessel hull.

8. The apparatus for reducing drag on a nautical vessel of claim 1, wherein said apparatus is permanently attached to said vessel hull.

9. The apparatus for reducing drag on a nautical vessel of claim 1, wherein said plurality of air bubbles carried down with said stream of water lubricate a bow of said nautical vessel.

10. A drag reducing nautical vessel hull comprising:
a hull;
wherein said hull has a one or more open channels;
wherein said hull has a front and a bottom;
wherein said one or more open channels are on a front of said hull;
wherein said one or more open channels has one or more air injectors;
one or more enclosed lower sections;
wherein said one or more enclosed lower sections are wider than said one or more open channels;
wherein said one or more enclosed lower sections are located at a bottom of said one or more open channels and wherein said one or more enclosed lower sections are substantially on said bottom of said hull;
a plurality of outlet holes intermediate each of said open channels and a rear end of respective one of said enclosed lower sections;
wherein a stream of water, generated by a nautical vessel's motion, enters said one or more air injectors and creates a depression that pulls an air into said stream of water;
wherein a plurality of air bubbles are formed in said stream of water;
wherein said plurality of air bubbles is carried in said stream of water down said one or more open channels to said one or more lower sections;
wherein said stream of water and said plurality of air bubbles slow down and separate within said one or more enclosed lower sections such that said plurality of air bubbles forms a separated volume of compressed air that is above and compressed by said stream of water;
wherein said separated volume of compressed air has a pressure greater than an external water pressure, which allows said separated volume of compressed air to exit through said plurality of outlet holes as a plurality of microbubbles;
and wherein said plurality of microbubbles lubricates a bottom of said hull.

11. The drag reducing nautical vessel hull of claim 10, wherein said one or more air injectors are on an adjustable frame that allows said one or more air injectors to be adjusted between a high water line and a low water line.

12. The drag reducing nautical vessel hull of claim 10, wherein said hull has at least two of said one or more open channels.

13. The drag reducing nautical vessel hull of claim 10, wherein said one or more air injectors is fed by an air fan.

14. The drag reducing nautical vessel hull of claim 10, further comprising:
a one or more secondary bottom air injectors;
wherein said stream of water, generated by said nautical vessel's motion, enters said one or more secondary bottom air injectors and creates a bottom depression that pulls said volume of compressed air that has not exited through said plurality of outlet holes into said stream of water creating a secondary mixture of air bubbles and water;
wherein said secondary mixture of air bubbles and water exits said one or more secondary bottom air injectors and lubricates a bottom of said nautical vessel.

15. The drag reducing nautical vessel hull of claim 10, wherein said plurality of air bubbles exiting said plurality of holes are released along the length of a bottom of said hull and reduce a drag on a hull of a nautical vessel as said nautical vessel moves through a body of water.

16. The drag reducing nautical vessel hull of claim 10, wherein said stream of water and said plurality of air bubbles that is carried down said one or more open channels is directed into one or more air cavities and said air replenishes a pocket of air contained in said one or more air cavities.

* * * * *